(12) United States Patent
Turner et al.

(10) Patent No.: US 8,379,674 B2
(45) Date of Patent: Feb. 19, 2013

(54) TIMESTAMP CONVERSION

(75) Inventors: Adrian Charles Turner, Hampshire (GB); Brian Richardson, Hampshire (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 487 days.

(21) Appl. No.: 12/663,387

(22) PCT Filed: Jun. 2, 2008

(86) PCT No.: PCT/EP2008/056764
§ 371 (c)(1), (2), (4) Date: Dec. 7, 2009

(87) PCT Pub. No.: WO2008/148732
PCT Pub. Date: Dec. 11, 2008

(65) Prior Publication Data
US 2010/0177791 A1 Jul. 15, 2010

(30) Foreign Application Priority Data
Jun. 8, 2007 (GB) .................................. 0711095.0

(51) Int. Cl.
*H04N 7/173* (2011.01)
(52) U.S. Cl. ... 370/509; 370/503; 370/421; 370/395.62; 709/253; 709/248; 375/355; 375/358
(58) Field of Classification Search .................. 370/509, 370/503, 401, 395.62, 394, 421, 519, 516, 370/252; 709/253, 248; 375/355, 358; 386/65, 386/201, 124, 95, 112, 129
See application file for complete search history.

(56) References Cited

U.S. PATENT DOCUMENTS
(Continued)

FOREIGN PATENT DOCUMENTS
EP  1 189 444 A1  3/2002
EP  1 294 116 A2  3/2003
(Continued)

*Primary Examiner* — Michael Thier
*Assistant Examiner* — Jamal Javaid
(74) *Attorney, Agent, or Firm* — Nixon & Vanderhye, P.C.

(57) ABSTRACT

A target time stamp on a target time-base is obtained from a originating time stamp on an originating time-base of an audio video transport system by first taking samples simultaneously from transport streams having the originating time-base and target timebase, respectively. A current sample and an immediately preceding sample for the originating time-base and target time-base are stored, respectively. A first difference is determined between the current sample and an immediately preceding sample for the originating time-base and a second difference is determined between the current sample and an immediately preceding sample for the target time-base, respectively. The first difference is added to the current sample of the originating time base and the second difference is added to the current sample of the target time-base if the current sample is less than the originating timestamp and the first difference is subtracted from the current sample of the originating time base and the second difference is subtracted from the current sample of the target time-base if the current sample is greater than the originating timestamp. The first difference and the second difference are halved and the addition or subtraction and halving iterated until the first difference or the second difference is negligibly small. The iterated current sample of the target time-base is output as the target time-stamp.

10 Claims, 4 Drawing Sheets

U.S. PATENT DOCUMENTS

| | | |
|---|---|---|
| 5,202,014 A | 4/1993 | Zones et al. |
| 5,563,875 A * | 10/1996 | Hefel et al. .................... 370/249 |
| 5,661,665 A | 8/1997 | Glass et al. |
| 5,896,524 A | 4/1999 | Halstead, Jr. et al. |
| 6,449,291 B1 * | 9/2002 | Burns et al. .................... 370/516 |
| 2002/0196850 A1 | 12/2002 | Liu et al. |
| 2003/0086339 A1 * | 5/2003 | Dally et al. .................... 368/202 |
| 2004/0100996 A1 * | 5/2004 | Williams et al. ............... 370/537 |
| 2005/0125717 A1 * | 6/2005 | Segal et al. .................... 715/512 |
| 2006/0093045 A1 | 5/2006 | Anderson et al. |
| 2006/0133460 A1 * | 6/2006 | Ettorre et al. ................. 375/149 |

FOREIGN PATENT DOCUMENTS

| | | |
|---|---|---|
| WO | 99/59391 A2 | 11/1999 |

* cited by examiner

TIMESTAMP CONVERSION

This application is the U.S. national phase of International Application No. PCT/EP2008/056764 filed 2 Jun. 2008, which designated the U.S. and claims priority to GB Application No. 0711095.0 filed 8 Jun. 2007, the entire contents of each of which are hereby incorporated by reference.

TECHNICAL FIELD

This invention relates to a method and apparatus for timestamp conversion.

BACKGROUND

In packet-based systems, and in MPEG systems in particular, packets must be issued from play-out equipment in a correct order and at a correct time. Timing is important to avoid over-/under-flow in buffers of receiving equipment. Originating equipment, for example an encoder, maintains a model of a buffer of the receiving equipment and issues packets to an output of the originating equipment such that this buffer is kept sufficiently, but not overly, full. In MPEG video compression and transmission systems, this buffer is designed primarily for a video compression process itself and allows only minimally for timing disturbances that might occur in multiplexing and transmission. As MPEG systems have developed technically and have penetrated the market, demands on its use have changed, in particular in applications of MPEG in networks that are based on asynchronous packet methods, where special attention has to be placed on ensuring that relatively coarse transmission timing tolerances allowed in such networks can be managed.

Any multiplexing equipment must ensure that whatever a method of transmission, this packet timing is not unduly disturbed. In traditional multiplexing systems, packets are received on a number of input interfaces, timestamped upon receipt and played out with a least jitter possible, compatible with real-time multiplexing. Typically, in MPEG or similar video compression systems, one multiplexer outputs one or a small number of transport streams and these are all generated with reference to one master clock, usually with a clock frequency of 27 MHz in the case of MPEG2 or broadcast video systems.

In a quest for higher density, and with a transition to Ethernet/IP infrastructure, instead of an ASI format traditionally used within broadcast networks, single pieces of equipment handle more channels and are required to output many more transport streams than before. Within one piece of equipment, a number of different clock or timing sources exist, where in the past there was only one.

There is a requirement to provide a method whereby timestamps can be effectively passed between time reference domains, so as to facilitate multiplexing while introducing minimal jitter.

Figure 1:
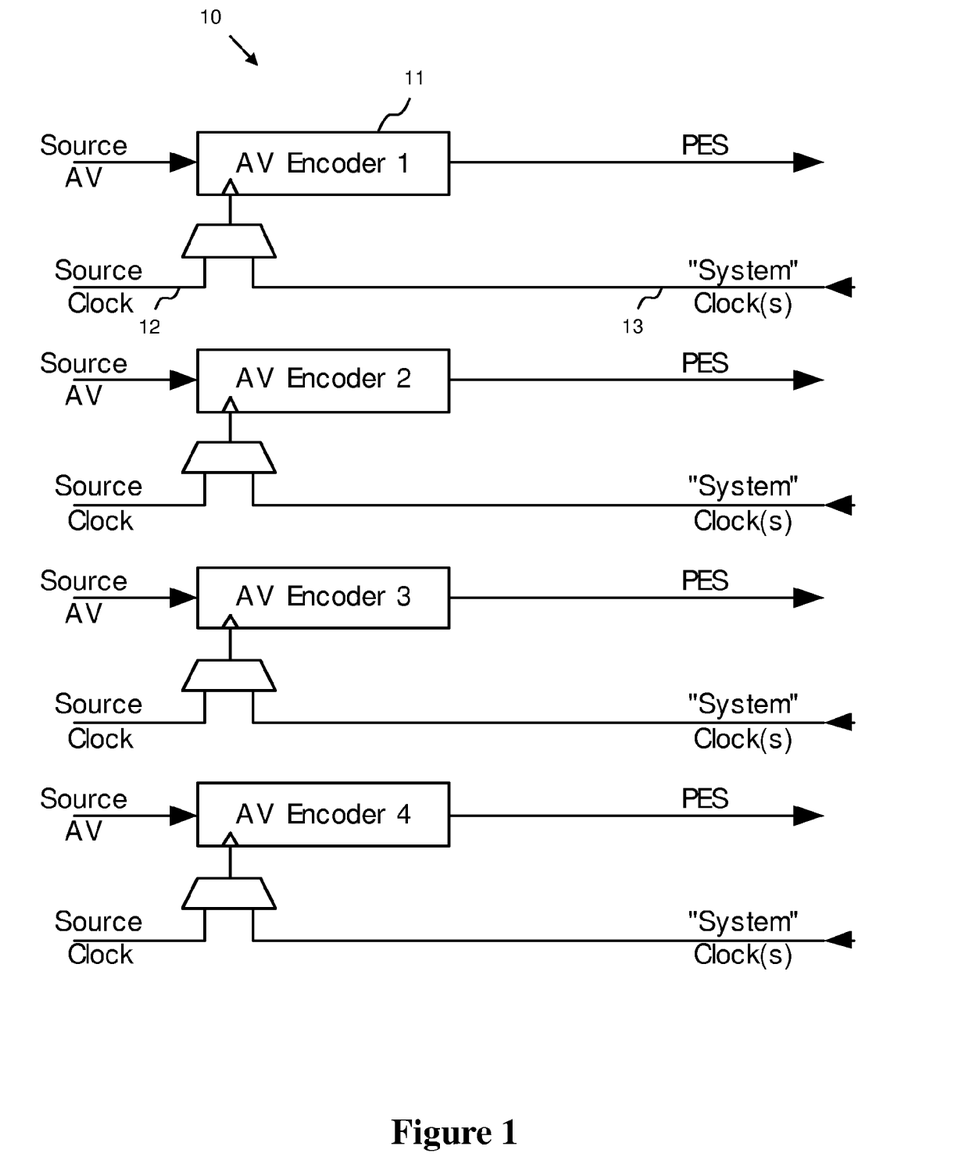
FIG. 1 is a schematic diagram of a multi-channel broadcast encoder system with four encoders, without multiplexing.

Referring to FIG. 1, in a multi-channel broadcast encoder 10, with, for example, four audio video encoders 11 in one piece of equipment, each encoder can be clock-locked to an incoming source clock 12, "video clock locked", or the encoder can be locked to a system reference clock 13, sometimes referred to as locked to an HSYNC or black and burst signal. If all the encoders are locked to a system clock signal 13, then managing the process timing is quite simple, as there is only one clock. If, however, it is desired to run each encoder independently, then each one has its own timing reference and this must be allowed for in succeeding multiplexing stages.

In such multi-channel coding and/or multiplexing equipment, there is also likely to be a requirement for generation of multiple transport streams—some being single service, others being multiple service and hence consisting of differently timed sources.

Figure 2:
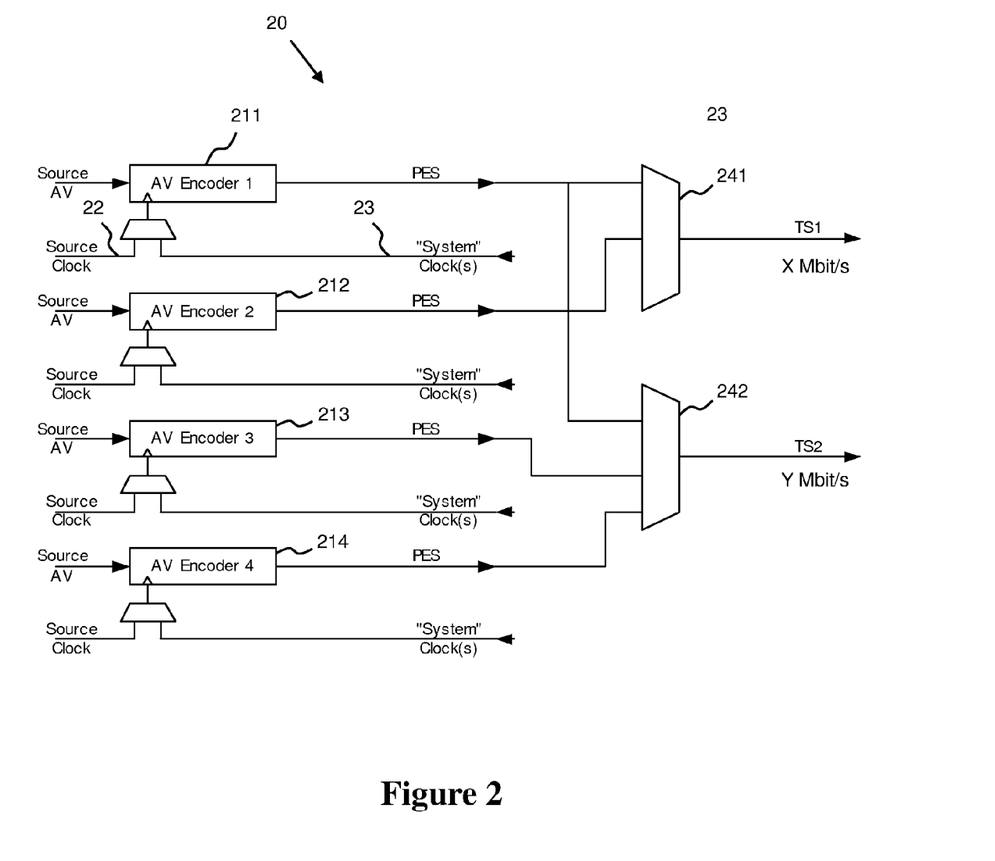
FIG. 2 is a schematic diagram of a multi-channel broadcast encoder system with multiplexing to provide two multi-program transport stream outputs.

Furthermore, it is necessary to consider a clock reference controlling a rate of these transport streams. FIG. 2 shows a multichannel broadcast encoder 20 with four audio video encoders 211-4 in parallel with outputs of a first encoder 211 and a second encoder 212 to a first multiplexer 241 and outputs of the first encoder 211, a third encoder 213 and a fourth encoder 214 to a second multiplexer 242. The first multiplexer 241 has a first output with a time-base TS1 and the second multiplexer 242 has a second output with a time-base TS2. Thus, referring to FIG. 2 it could be, for instance, that a first output with time-base TS1 is required, that is running at a first rate X Mbit/s clocked off a clock 22 of the first encoder 211 and consisting only of AV services from the first encoder 211 and second encoder 212 multiplexed together. A second output with time-base TS2 is also required, running at a second rate Y Mbit/s clocked off a clock of the fourth encoder 214 and consisting only of AV services output from the first encoder 211, the third encoder 213 and the fourth encoder 214 multiplexed together. Clearly a packet scheduling and play-out scheme is required that can cope with a diverse set of input and output time-bases.

It would be possible to achieve the required timing control using various Phase Locked Loop (PLL) arrangements such that accurate knowledge of one time-base can be maintained, while operating in another. Or, alternatively, using a very fast processor and sophisticated software that was able to monitor and manipulate all time-bases together.

Figure 3:
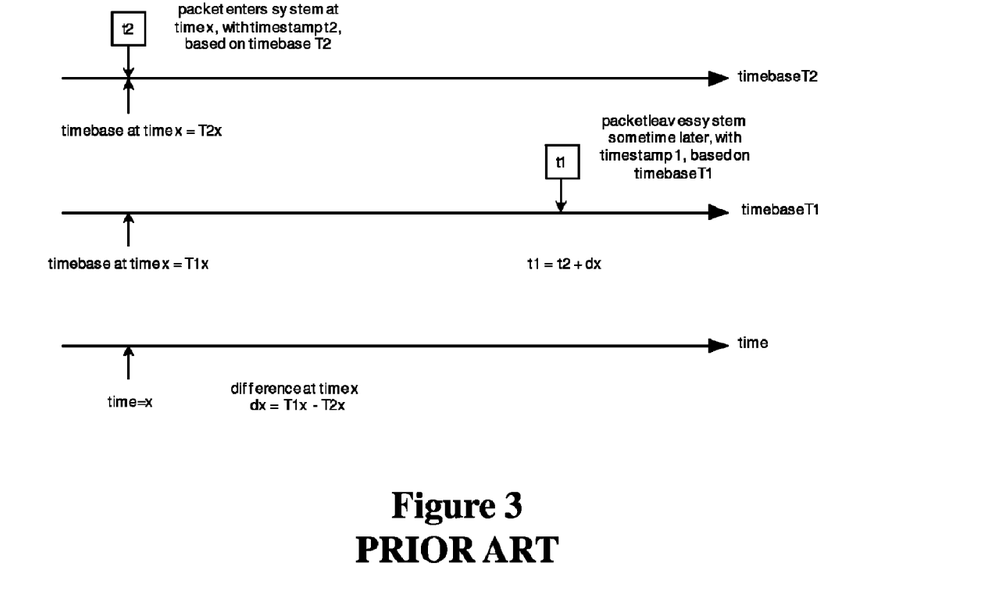
FIG. 3 shows best current practice in solving a timing problem addressed in this technology disclosed herein.

Current best practice in solving this problem is to operate real time systems, whereby a previously sampled difference-value is subtracted from an instantaneous sample of a free-running time-base, to give a timestamp on a new time-base. This prior art process is illustrated by FIG. 3.

This method requires specialised hardware to implement, and requires multiple implementations of the hardware, one for each target time-base. Such hardware may, for example, consist of a PLL and a counter.

In a real-time system, a correct value exists at only one point in time, so this point must be well chosen. The system must also be ready to receive a packet at time x, and must sample both time-bases at the time the packet is received, for immediate processing. This implies multiple dedicated hardware.

The system does not account for drift between time-bases during a period a packet is held in the system. At low data rates this is a significant problem for best current practice as the time between timing markers is long thus leading to a greater risk of a large timing drift accumulating. What is required is a process that automatically takes account of such drift and so allows operation at lower bit rates than conventional methods.

SUMMARY

It is an object of the technology disclosed herein at least to ameliorate the aforesaid disadvantages in the prior art.

According to the technology disclosed herein there is provided a time-base conversion method for obtaining a target time stamp on a target time-base from an originating time stamp on an originating time-base of a system. Samples are taken simultaneously from transport streams having the originating time-base and target time-base, respectively. A current sample and an immediately preceding sample for the originating time-base and target time-base, respectively are stored.

A first difference is determined between the current sample and the immediately preceding sample for the originating time-base and a second difference between the current sample and the immediately preceding sample for the target time-base, respectively. Half the first difference is added to the current sample of the originating time base and half the second difference to the current sample of the target time-base if the current sample is less than the originating time-stamp. Half the first difference is subtracted from the current sample of the originating time base and half the second difference is subtracted from the current sample of the target time-base if the current sample is more than the originating time-stamp. The first difference and the second difference are halved again and iteratively added or subtracted as in the previous step and these two steps repeated until the first difference or the second difference is negligibly small. The iterated current sample of the target time-base is then output as the target time-stamp.

Conveniently, the method comprises an initial iterative step of determining an initial difference between the originating time-stamp and the current sample and half the first difference is added to the current sample of the originating time base and half the second difference to the current sample of the target time-base if the initial difference is negative. Half the first difference is subtracted from the current sample of the originating time base and half the second difference subtracted from the current sample of the target time-base if the initial difference is positive.

Advantageously, a rate at which the time-bases are sampled is sufficiently high to avoid inaccuracy due to clock wander.

Advantageously, a rate at which the time-bases are sampled is sufficiently low that an interval between samples is at least as long as a duration of a packet within the system.

Alternatively, the method comprises storing more than two samples and using a pre-interpolation search to find two most appropriate samples to use for the interpolation process.

According to a second aspect of the technology disclosed herein, there is provided a time-base converter arranged to obtain a target time stamp on a target time-base from a originating time stamp on an originating time-base of a system. The time base converter comprises sampling means arranged to take samples simultaneously from transport streams having the originating time-base and target time-base, respectively. Storage means are arranged to store a current sample and an immediately preceding sample for the originating time-base and target time-base, respectively. Processing means are arranged to determine a first difference between the current sample and the immediately preceding sample for the originating time-base and a second difference between the current sample and the immediately preceding sample for the target time-base, respectively. Summing and subtracting means are arranged to add half the first difference to the current sample of the originating time base and half the second difference to current sample of the target time-base if the current sample is less than the originating time-stamp and to subtract half the first difference from the current sample of the originating time base and half the second difference from the current sample of the target time-base if the current sample is more than the originating time-stamp. Dividing means are arranged to halve the first difference and the second difference. Iterating means are arranged to iterate the summing or subtracting and halving until the first difference or the second difference is negligibly small. Outputting means are arranged to output the iterated current sample of the target time-base as the target time-stamp.

Preferably, the time-base converter further comprises means for determining an initial difference between the originating time-stamp and the current sample wherein the summing and subtracting means is arranged to add half the first difference to the current sample of the originating time base and half the second difference to the current sample of the target time-base if the initial difference is negative and to subtract half the first difference from the current sample of the originating time base and half the second difference from the current sample of the target time-base if the initial difference is positive.

Advantageously the time-base converter is arranged such that a rate at which the time-bases are sampled is sufficiently high to avoid inaccuracy due to clock wander.

Advantageously the time-base converter is arranged such that a rate at which the time-bases are sampled is sufficiently low that an interval between samples is at least as long as a duration of a packet within the system.

Alternatively, the time-base converter is arranged to store more than two samples and to use a pre-interpolation search to find two most appropriate samples to use for the interpolation process.

BRIEF DESCRIPTION OF THE DRAWINGS

The technology disclosed herein will now be described, by way of example, with reference to the accompanying drawings in which.

In the Figures, like reference numbers denote like parts.

DETAILED DESCRIPTION

The method according to the technology disclosed herein is now described.

Figure 4:
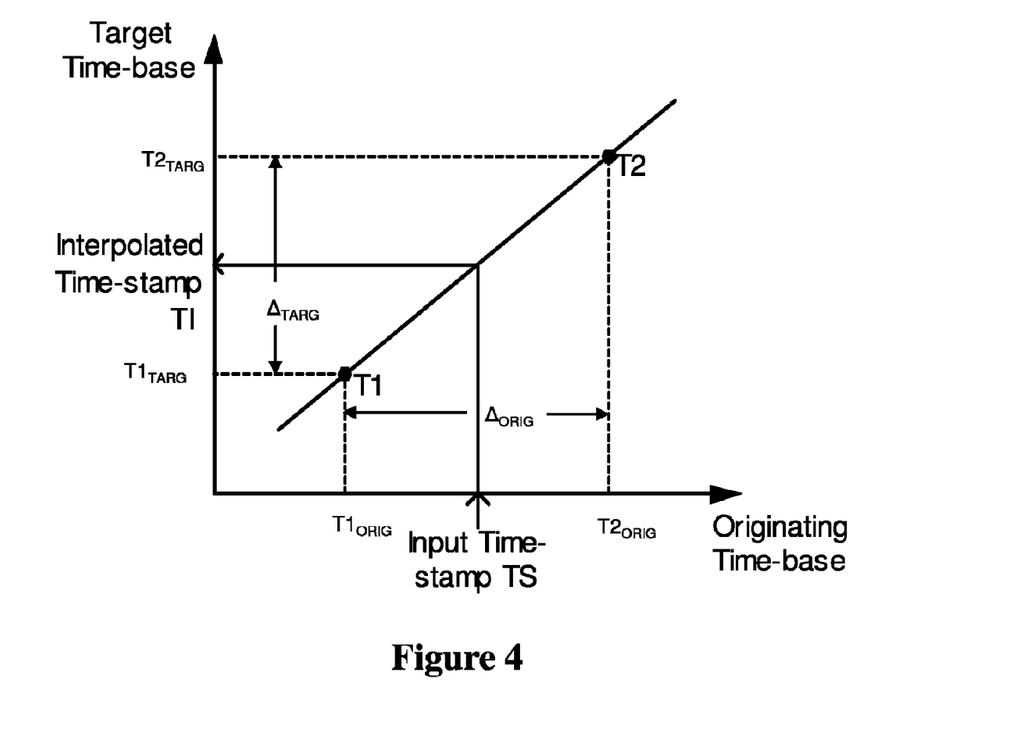
FIG. 4 is a graph of a target time-base vs. an originating time-base showing time-base interpolation for timestamp conversion according to the technology disclosed herein.
Figure 5:
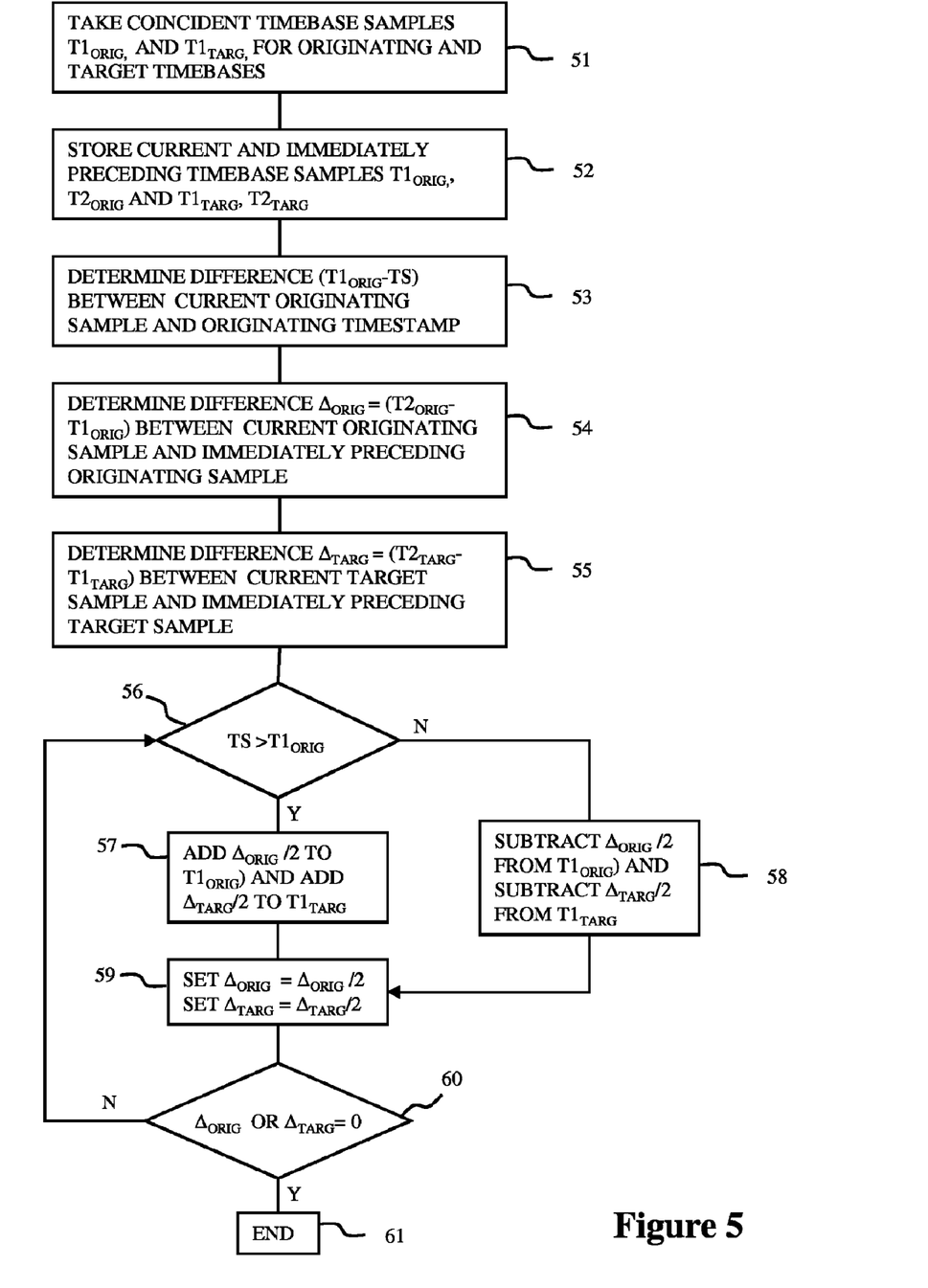
FIG. 5 is a flowchart of a method according to the technology disclosed herein.

Referring to the flowchart of FIG. 5, samples of time-bases are taken, step 51, coincidentally, to a nearest lsb, at regular intervals. These values are stored, step 52, in a table, consisting of two entries $T1_{orig}$, $T2_{orig}$, $T1_{target}$ and $T2_{target}$ per time-base—the most recent sample and the next most recent. There are conditions that apply to the rate of sampling of the time-bases, and these are discussed later herein. A timestamp TS is converted from its originating time-base to another target time-base by means of a number of table look-ups and an interpolation or extrapolation process. This yields an equivalent timestamp TI but referenced to a different time-base, as illustrated by FIG. 4.

An efficient method of interpolation/extrapolation can be performed by means of a three step process mainly involving shifts and adds/subtracts. The three steps are:

STEP 1: table entries $T1_{orig}$ and $T2_{orig}$ and $T1_{target}$ and $T2_{target}$ for the originating and target time-bases, respectively, representing samples of the time-bases to be matched, are read from their respective memory register locations. The particular values of the two time-bases that are required to be matched at this instant are the timestamps TS and TI, as shown in FIG. 4. The method of calculating the value of TI corresponding to TS is as follows:

for the originating time-base, TS, the originating time-base timestamp, is subtracted from both T1$_{orig}$ and T2$_{orig}$.

T1$_{orig}$-TS is slightly negative if TS>T1$_{orig}$ and
T1$_{orig}$-TS is a small positive number if TS<T1$_{orig}$.

STEP 2: the difference Δ$_{orig}$=(T2$_{orig}$-T1$_{orig}$) is calculated, step 54.

STEP 3: the following iterative process is applied:

If T1$_{orig}$-TS is negative, (i.e. on first iteration TS>T1$_{orig}$) add Δ$_{orig}$ to T1$_{orig}$, step 57

Else if T1$_{orig}$-TS is positive (i.e. on first iteration TS<T1$_{orig}$), subtract Δ$_{orig}$ from T1$_{orig}$, step 58

Set Δ$_{orig}$=Δ$_{orig}$/2, step 59

Repeat step 3 for new value of T1$_{orig}$

This is done for a fixed number of iterations, or until Δ$_{orig}$ becomes arbitrarily small, step 60.

At the same time as this is being done on T1$_{orig}$ and T2$_{orig}$ originating time-base values, exactly the same number of add/subtract/halve manipulations are performed on the corresponding values from the target time-base T1$_{target}$ and T2$_{target}$. So while T1$_{orig}$ iterates to TS, T1$_{target}$ iterates to the target time stamp interpolated value TI that is desired.

Extending this to multiple time-bases, it is easy to add multiple targets, because each additional target time-base adds only one additional add/subtract/halve stage and no further computation to the originating time-base. Obviously the table input must be made larger to accommodate the extra time-bases.

The complexity is proportional to n, where n is the number of time-bases. This is quite an efficient system, especially compared with traditional systems and when n is large, as these will likely have a complexity that is proportional to n$^2$.

This process can be extended to deal gracefully with extrapolation (although with the greater tendency to inaccuracy that extrapolation entails), by removing the assumption that after the subtraction of TS, T1 is negative and T2 is positive. It could of course be that both T1 and T2 are negative, or both are positive.

First compute:

$$\Delta_{orig}=T2_{orig}-T1_{orig}, \text{step 53}$$

$$\Delta_{target}=T2_{target}-T1_{target}, \text{step 54}$$

set $T1_{orig}=T1_{orig}-ts$, initial subtraction step

Then iterate:

If T1$_{orig}$ < 0 (i.e. TS>T1$_{orig}$), step 56, then
  T1$_{orig}$ = T1$_{orig}$ + Δ$_{orig}$/2, step 57
  T2$_{target}$ = T2$_{target}$ + Δ$_{target}$/2, step 57
Else if T1$_{orig}$ > 0 (i.e. TS<T1$_{orig}$), step 56, then
  T1$_{orig}$ = T1$_{orig}$ − Δ$_{orig}$, step 58
  T2$_{target}$ = T2$_{target}$ − Δ$_{target}$, step 58
set  Δ$_{orig}$ = Δ$_{orig}$/2, step 59
set  Δ$_{target}$ = Δ$_{target}$/2, step 59
End if $$\Delta_{orig} \approx \Delta_{orig}/2 \text{ or}$$

$$\Delta_{target} \approx \Delta_{target}/2, \text{steps 60, 61}$$

i.e. when Δ$_{orig}$ or Δ$_{target}$ is negligibly small.

Having developed a method where timestamps may be propagated through a system, while transitioning through various time-bases, a packet scheduling system may be run off a first time-base, handling packets generated and originally scheduled from a second time-base.

Furthermore, where it becomes necessary to insert valid timestamps into the outgoing stream, for example Programme Clock References (PCR), the precise packet output time can be taken from the time-base that is generating the play-out, and then a PCR, valid for the AV service in question, can be computed by means of a similar conversion process.

The rate at which the time-bases are sampled must be sufficiently high to avoid inaccuracy due to clock wander, although one could reasonably expect or dictate that this is at a very low level, but be sufficiently low that the interval between table entries is long enough to cover a usual interpolation operating range, this is likely to be the duration of a packet within the system and so probably quite short. As has been noted, it is possible to make the technique work for extrapolation; however for accuracy reasons this is to be avoided, and the extra range is better used to deal with an occasional need, rather than the norm. If the above two requirements are impossible to meet—for example due to high levels of clock wander and long delays through the system, then it may be necessary to store more than two samples in the table and then use a pre-interpolation search that finds the two most appropriate table entries to use for the interpolation process on the current input timestamp.

The method according to this technology disclosed herein is not constrained to operate in real time. Instead, the new timestamp may be computed at any time from its arrival into the system, up to onward processing that is dependent on the timestamp. 'Current time' does not feature in the equation. An advantage of this technology disclosed herein is that a simple processing engine may perform extrapolation as well as interpolation. This removes constraints on inputs that may otherwise be necessary to ensure interpolation and enables applications where only extrapolation is possible without additional hardware or computing resource.

U.S. Pat. No. 5,020,014 describes the use of an interpolating engine for the alignment of timing markers but does not include the initial subtraction process and its subsequent iteration used in this technology disclosed herein and described in detail above that makes the interpolating stages very simple. This means that in the technology disclosed herein the subtraction of the timestamp from the current value does not have to be performed at every stage, which is a significant improvement over the prior art. Furthermore, the prior art does not extend the process to extrapolation.

Furthermore, the method of this technology disclosed herein is implemented by simple and well-known mathematical operations that are common in digital processing units such as computer CPUs. Thus the method may be implemented in any of a multitude of general purpose processors. This provides an advantage that the interpolation engine is less costly to implement than the prior art, as fewer resources are required. The cost saving is greater, the larger the number of time-bases that require matching.

Additionally, as real time operation is not required, one processing unit may handle many interpolations between various different time-bases. Therefore only one instance of the processor is required, for many target time-bases.

The technology disclosed herein avoids all PLLs, and so does not have issues with lock-time, bandwidth, etc. The technology disclosed herein also allows processing elements to examine relevant timestamps and perform timestamp comparisons within a single time-base domain (if desired) so as to remove a requirement for very fast processing and manipulation. Furthermore, the technique is simple and efficiently scalable from two time-base domains upwards.

The invention claimed is:

1. A time-base conversion method for obtaining a target time stamp on a target time-base from an originating time stamp on an originating time-base of a system comprising the steps of:
   a. taking samples simultaneously from transport streams having the originating time-base and target time-base, respectively;
   b. storing a current sample and an immediately preceding sample for each of the originating time-base and the target time-base, respectively;
   c. determining a first difference between the current sample and the immediately preceding sample for the originating time-base and a second difference between the current sample and the immediately preceding sample for the target time-base, respectively;
   d. adding half the first difference to the current sample of the originating time base and half the second difference to the current sample of the target time-base if the current sample of the originating time base is less than the originating time-stamp and subtracting half the first difference from the current sample of the originating time base and half the second difference from the current sample of the target time-base if the current sample of the originating time base is more than the originating time-stamp;
   e. halving the first difference and the second difference;
   f. iterating steps d. and e. until the first difference or the second difference is less than a predetermined value; and
   g. outputting the iterated current sample of the target time-base as the target time-stamp.

2. A method as claimed in claim 1, comprising an initial iterative step of determining an initial difference between the originating time-stamp and the current sample of the originating time base wherein step d) comprises adding half the first difference to the current sample of the originating time base and half the second difference to the current sample of the target time-base if the initial difference is negative and subtracting half the first difference from the current sample of the originating time base and half the second difference from the current sample of the target time-base if the initial difference is positive.

3. A method as claimed in claim 1, wherein a rate at which the time-bases are sampled at a predetermined rate to avoid inaccuracy due to clock wander.

4. A method as claimed in claim 1, wherein a rate at which the time-bases are sampled is below a predetermined rate so that an interval between samples is at least as long as a duration of a packet within the system.

5. A method as claimed in claim 1, comprising storing more than two samples and using a pre-interpolation search to find two most appropriate samples to use for the interpolation process.

6. A time-base converter arranged to obtain a target time stamp on a target time-base from a originating time stamp on an originating time-base of a system, the time-base converter comprising a processor configured to perform the following acts:
   a. taking samples simultaneously from transport streams having the originating time-base and target time-base, respectively;
   b. storing a current sample and an immediately preceding sample for each of the originating time-base and the target time-base, respectively;
   c. determining a first difference between the current sample and the immediately preceding sample for the originating time-base and a second difference between the current sample and the immediately preceding sample for the target time-base, respectively;
   d. adding half the first difference to the current sample of the originating time base and half the second difference to current sample of the target time-base if the current sample of the originating time base is less than the originating time-stamp, and subtracting half the first difference from the current sample of the originating time base and half the second difference from the current sample of the target time-base if the current sample of the originating time base is more than the originating time-stamp;
   e. halving the first difference and the second difference;
   f. iterating the summing or subtracting and halving until the first difference or the second difference less than a predetermined value; and
   g. outputting the iterated current sample of the target time-base as the target time-stamp.

7. A time-base converter as claimed in claim 6, wherein the processor is further configured to determine an initial difference between the originating time-stamp and the current sample of the originating time base, and to add half the first difference to the current sample of the originating time base and half the second difference to the current sample of the target time-base if the initial difference is negative, and to subtract half the first difference from the current sample of the originating time base and half the second difference from the current sample of the target time-base if the initial difference is positive.

8. A time-base converter as claimed in claim 6, arranged such that a rate at which the time-bases are sampled at a predetermined rate to avoid inaccuracy due to clock wander.

9. A time-base converter as claimed in claim 6, arranged such that a rate at which the time-bases are sampled is below a predetermined rate so that an interval between samples is at least as long as a duration of a packet within the system.

10. A time-base converter as claimed in claim 6, wherein the processor is arranged to store more than two samples and to use a pre-interpolation search to find two most appropriate samples to use for the interpolation process.

* * * * *

UNITED STATES PATENT AND TRADEMARK OFFICE
CERTIFICATE OF CORRECTION

PATENT NO. : 8,379,674 B2  
APPLICATION NO. : 12/663387  
DATED : February 19, 2013  
INVENTOR(S) : Turner et al.

Page 1 of 1

It is certified that error appears in the above-identified patent and that said Letters Patent is hereby corrected as shown below:

On the Title Page, in Item (57), under "ABSTRACT", in Column 2, Lines 1-2, delete "a originating" and insert -- an originating --, therefor.

In the Specifications:

In Column 3, Lines 39-40, delete "a originating" and insert -- an originating --, therefor.

In the Claims:

In Column 7, Line 55, in Claim 6, delete "a originating" and insert -- an originating --, therefor.

In Column 8, Line 27, in Claim 6, delete "difference" and insert -- difference is --, therefor.

Signed and Sealed this  
Thirteenth Day of August, 2013

Teresa Stanek Rea  
*Acting Director of the United States Patent and Trademark Office*